May 30, 1950 — F. E. OAKHILL — 2,509,650
FILM FEEDING PRESSER
Original Filed Dec. 2, 1944

Inventor:
Frederic E. Oakhill

Patented May 30, 1950

2,509,650

UNITED STATES PATENT OFFICE 2,509,650

FILM FEEDING PRESSER

Frederic E. Oakhill, Wilmette, Ill., assignor to Prismacolor, Inc., Chicago, Ill., a corporation of Illinois Application November 10, 1945, Serial No. 627,820, which is a division of application Serial No. 566,310, December 2, 1944. Divided and this application February 17, 1947, Serial No. 729,065

2 Claims. (Cl. 271—2.3)

This invention relates to improvements in film feeding presser for photographic film printing machines, and other machines in which the film is advanced in a step by step manner, and the subject matter of the present application was divided out of my pending application, Serial No. 566,310, filed December 2, 1944, for an improvement in Film printing machines, and has been divided out of my pending divisional application Serial No. 627,820, filed November 10, 1945.

Upon the negative film are photographed groups of black and white images of an objective or many objectives. The individual images of each group are called "frames" since the images of each group are equally spaced apart by more or less opaque bars and likewise the groups of frames are equally spaced apart by opaque bars.

In accordance with the present invention, the positive and negative films are advanced through a printing zone in a step by step manner by sprockets and are permitted to remain quiescent during the printing operation.

The principal object of this invention is the provision of means whereby to facilitate the threading of the positive and negative films on to certain film advancing sprockets.

Another object is the provision of retractible idler rollers for pressing against the film to positively hold it in engagement with the sprocket which advances the film.

Other objects and advantages will appear in the course of this specification, and with all of said objects and advantages in view, this invention consists in the several novel features of construction, arrangement and combination of parts hereinafter fully set forth and more particularly defined in the appended claims.

The invention is clearly illustrated in the drawing accompanying this specification, in which.

Only such mechanism as relates to the present invention is illustrated in the accompanying drawing, but the entire machine is shown and described in its entirety in the parent application, Serial No. 566,310 from which the instant application has been divided.

Referring now to said drawing which is merely illustrative of one embodiment of the invention, a frame structure is provided upon which the several instrumentalities are mounted. Mounted upon the front end of the frame structure is a panel 6 upon which various instruments are mounted.

Figure 1:
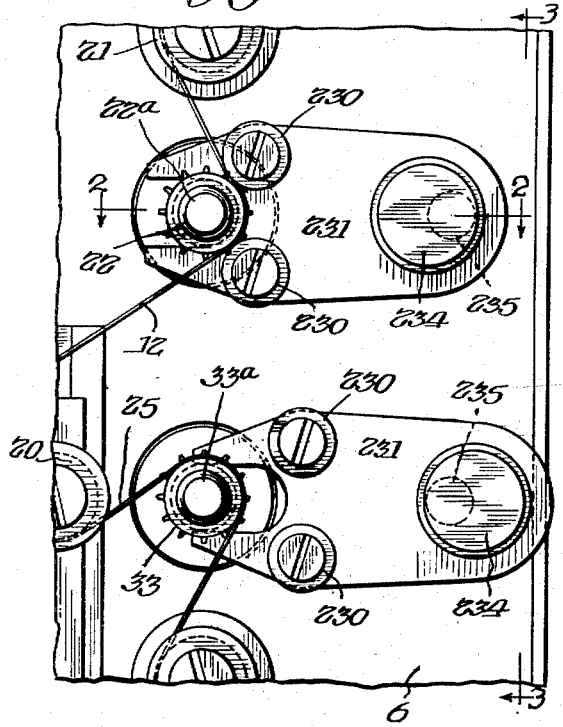
Fig. 1 is a front elevation of two film sprockets and associated film feeding pressers for holding the films in contact with the sprockets, one of the film pressers being shown in its retracted position.
Figure 2:
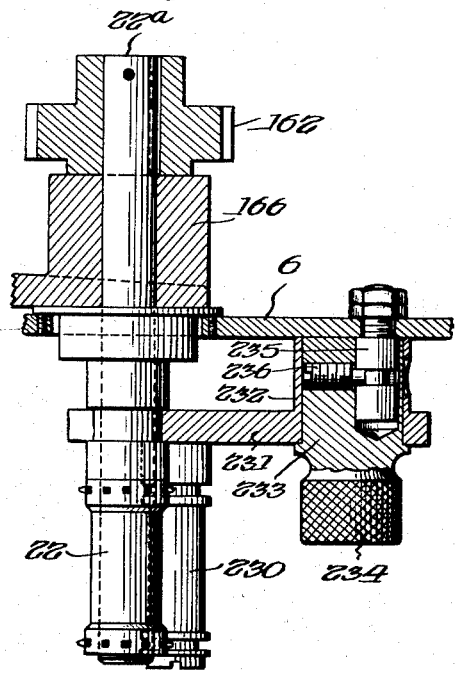
Fig. 2 is a horizontal section taken on the line 2—2 of Fig. 1.

In Fig. 1 is shown a fragment of a positive film 12 and a fragment of the negative film 25. These films are trained around idlers 21, 20 respectively and around driving sprockets, two of which are shown at 22, 33.

Figure 3:
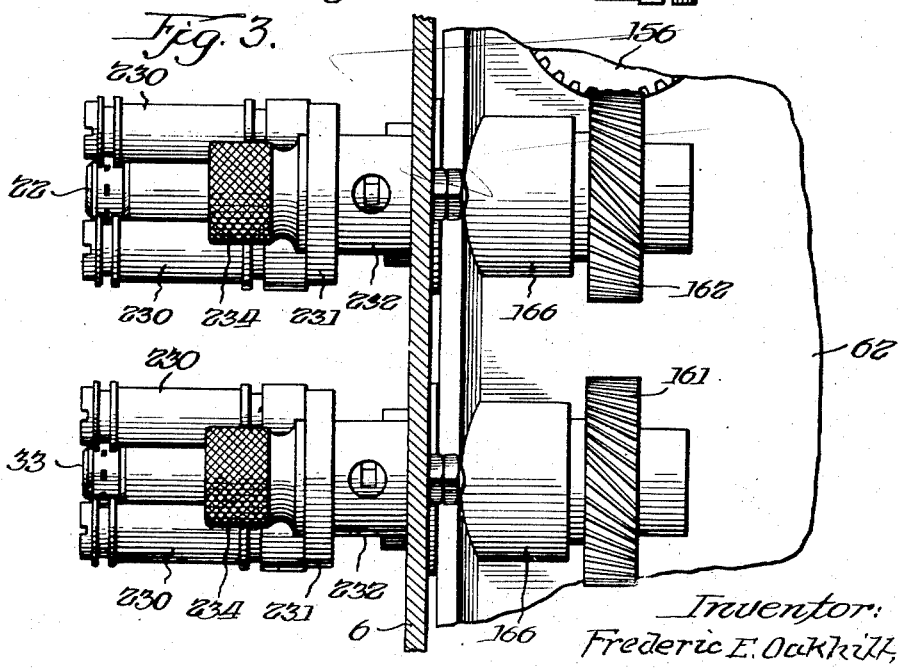
Fig. 3 is a view partly in side elevation of the mechanism seen in Fig. 1, and partly in vertical cross section taken on the line 3—3 of Fig. 1.

The film advancing sprockets are mounted respectively on shafts 22a, 33a which are journaled in bosses 166, formed upon the panel 6, and said shafts are driven by gearing (not shown) which include spiral gear wheels 162, 161 which are mounted respectively on the shafts 22a, 33a. A fragment of one of the driving spiral gear wheels is shown at 156 in Fig. 3.

Associated with the film driving sprockets are idlers 230 which positively hold the films in engagement with the sprockets. To facilitate threading the films between the sprockets and idlers 230, the idlers for each sprocket are rotatively mounted upon a retractible slotted arm 231 which straddles the shaft 22a or 33a and is provided with a hub 232 in which is rotatably mounted a stud 233 which is provided with a knurled knob 234 and is rotatively mounted upon a pin 235 eccentrically disposed with respect to the axis of the stud 233 and secured to the panel 6 as by nuts. A threaded pin 236 is secured in the stud and has a reduced end which engages in a groove in the pin 235 and prevents accidental disconnection between the arm 231 and the pin 235. By rotating the knurled knob 234 upon the eccentric pin to the position seen in the lower half of Fig. 1, the arm 231 and therewith the idlers 230 are retracted from the sprocket permitting the film to be readily trained around the sprocket.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a film advancing mechanism, a film advancing sprocket, a driven shaft upon which said sprocket is mounted, a bearing member for said shaft, a retractable slotted arm straddling said shaft, said arm being formed with a hub, a pair of idlers rotatively mounted on said arm, for retaining the film on the sprocket, a stationarily mounted pin formed with an annular groove, a stud eccentrically mounted on said pin and rotatably mounted in the hub of the arm and having a knob projecting beyond the arm, and a pin threaded in the stud and engaging in the groove of the first mentioned pin.

2. In a film-advancing mechanism, a film advancing sprocket, a driven shaft upon which said sprocket is mounted, a bearing member for said shaft, a retractable, slotted arm straddling said shaft, said arm being formed with a hub, a pair of idlers rotatably mounted on said arm for retaining the film on the sprocket, a stationarily mounted pin, a stud eccentrically mounted on said pin and rotatably mounted in the hub of said arm and having a knob projecting beyond the arm, and co-operating means on said pin and stud for maintaining the same in axial alignment.

FREDERIC E. OAKHILL.

REFERENCES CITED

The following references are of record in the file of this patent:

UNITED STATES PATENTS

| Number | Name | Date |
| --- | --- | --- |
| 1,857,116 | Dina | May 3, 1932 |
| 2,178,242 | Runge | Oct. 31, 1939 |
| 2,369,089 | Thomas | Feb. 6, 1945 |

FOREIGN PATENTS

| Number | Country | Date |
| --- | --- | --- |
| 437,805 | Germany | Dec. 2, 1926 |